(12) United States Patent
Adendorff et al.

(10) Patent No.: US 12,330,979 B2
(45) Date of Patent: Jun. 17, 2025

(54) METHOD FOR OPERATING A FIRED FURNACE AND ARRANGEMENT COMPRISING SUCH A FURNACE

(71) Applicant: LINDE GMBH, Pullach (DE)

(72) Inventors: Martin Adendorff, Munich (DE); Marco Golbach, Munich (DE); Michael Seys, Munich (DE); Benjamin Hentschel, Munich (DE); Maximilian Jarosch, Zorneding (DE)

(73) Assignee: Linde GmbH, Pullach (DE)

( * ) Notice: Subject to any disclaimer, the term of this patent is extended or adjusted under 35 U.S.C. 154(b) by 556 days.

(21) Appl. No.: 17/597,613

(22) PCT Filed: Jul. 8, 2020

(86) PCT No.: PCT/EP2020/025322
§ 371 (c)(1),
(2) Date: Jan. 13, 2022

(87) PCT Pub. No.: WO2021/008729
PCT Pub. Date: Jan. 21, 2021

(65) Prior Publication Data
US 2022/0348489 A1   Nov. 3, 2022

(30) Foreign Application Priority Data
Jul. 18, 2019   (EP) .................................. 19020436

(51) Int. Cl.
*F27D 17/10* (2025.01)
*C03B 5/237* (2006.01)
(Continued)

(52) U.S. Cl.
CPC .............. *C03B 5/237* (2013.01); *C25B 1/042* (2021.01); *F27D 17/10* (2025.01); *F27D 17/13* (2025.01)

(58) Field of Classification Search
CPC ..................................................... C03B 5/237
See application file for complete search history.

(56) References Cited

U.S. PATENT DOCUMENTS

| | | | | |
|---|---|---|---|---|
| 4,454,427 A | * | 6/1984 | Sosnowski | F23J 15/022 290/2 |
| 6,210,157 B1 | * | 4/2001 | Kobayashi | C01B 3/46 432/28 |

(Continued)

FOREIGN PATENT DOCUMENTS

| | | | | |
|---|---|---|---|---|
| CN | 109293221 A | * | 2/2019 | ............ C03B 5/237 |
| EP | 0 953 543 B1 | | 3/2006 | |

(Continued)

OTHER PUBLICATIONS

SOEC (Year: 2006).*
SOEC (Year: 2015).*

*Primary Examiner* — Jodi C Franklin
(74) *Attorney, Agent, or Firm* — Millen, White, Zelano & Branigan, P.C.; Brion P. Heaney (57) ABSTRACT

The invention concerns a process for operating a fired furnace which is heated using a fuel gas stream and forming a combustion product stream, wherein heat of at least part of the combustion product stream is used in forming a steam stream. It is provided that at least a part of the steam stream is subjected to a high-temperature electrolysis to form a hydrogen-containing and an oxygen-containing material stream, and that at least a part of the hydrogen-containing material stream is used as the fuel gas stream. A corresponding arrangement is also the subject of the invention.

18 Claims, 3 Drawing Sheets

(51) Int. Cl.
   *C25B 1/042* (2021.01)
   *F27D 17/13* (2025.01)

(56) References Cited

U.S. PATENT DOCUMENTS

| | | | |
|---|---|---|---|
| 9,551,487 B2* | 1/2017 | Mirmobin | F23D 14/126 |
| 2010/0236921 A1* | 9/2010 | Yang | C25B 1/04 |
| | | | 204/264 |
| 2011/0041740 A1 | 2/2011 | Reilly | |
| 2012/0021367 A1* | 1/2012 | Zucchelli | C03B 5/237 |
| | | | 432/25 |
| 2014/0075995 A1* | 3/2014 | Ando | C03B 1/02 |
| | | | 65/95 |
| 2018/0283789 A1* | 10/2018 | Kobayashi | C01B 3/46 |
| 2019/0003092 A1* | 1/2019 | Jarry | C03B 5/237 |
| 2019/0316040 A1* | 10/2019 | Kobayashi | C01B 3/56 |
| 2020/0116429 A1* | 4/2020 | Kobayashi | F27D 17/004 |

FOREIGN PATENT DOCUMENTS

| | | | | |
|---|---|---|---|---|
| EP | 2950024 A1 * | 12/2015 | | F27B 9/20 |
| JP | 2017 089916 A | 5/2017 | | |
| JP | 2018 184631 A | 11/2018 | | |
| WO | 2010/151157 A1 | 12/2010 | | |
| WO | 2013/093929 A1 | 6/2013 | | |

\* cited by examiner

METHOD FOR OPERATING A FIRED FURNACE AND ARRANGEMENT COMPRISING SUCH A FURNACE

The present invention relates to a process for operating a fired furnace, in particular a glass melting furnace, and to an arrangement with such a furnace and an electrolysis device according to the preambles of the respective independent claims.

PRIOR ART

Fired furnaces are commonly used to provide thermal energy, for example to a material to be processed or for a chemical reaction. The thermal energy is released inside the furnace by burning a fuel using an oxidizing agent. The operating modes of a furnace can be differentiated on the basis of the oxidizing agent being used.

In the following, reference is made mainly to glass furnaces or glass melting furnaces in order to explain the background of the invention and the measures proposed in accordance therewith. However, this invention is also suitable for use in conjunction with other fired furnaces, in particular when they are operated at a comparable temperature level to glass melting furnaces and if they use comparable media, which is the case e.g. with steel furnaces or other melting furnaces.

For glass furnaces or glass melting furnaces, air is typically used as an oxidizing agent. The air or, more precisely the oxygen in the, air is combusted together with the fuel inside the glass furnace to form a flue gas and to supply the energy required to melt the glass. The flue gas withdrawn from the glass melting furnace typically has a temperature of about 1500° C.

In glass melting furnaces operated with combustion air, the hot flue gas is typically used to preheat the combustion air to up to 1250° C. This preheating is performed in a discontinuously operated regenerator which has at least two regenerator beds. While the hot flue gas heats one regenerator bed during one cycle, the other regenerator bed is cooled by heating the combustion air. As soon as the regenerator bed through which the flue gas is passed is sufficiently warmed up, the flow through the beds is switched over and the combustion air is directed to the bed which has been warmed up before.

The regenerator bed cooled down in the previous step by heating the combustion air is now passed through by the hot flue gas and is correspondingly heated up.

If a regenerator is used to recover heat from the flue gas of glass melting furnaces, only a part of the waste heat can be recaptured. The waste heat that is released into the environment by the flue gas escaping from the regenerator is wasted. Depending on the oxidant used in the glass melting furnace, the temperature of the escaping flue gas stream can exceed 800° C., as described for example in EP 0 953 543 B1.

The operation of a glass melting furnace with (essentially) pure oxygen, which is also possible and in certain cases advantageous, makes a significant difference in terms of process technology. Due to the reduced volume flow of oxygen compared to the use of combustion air, heat recovery through oxygen heating is generally not realized. In addition to the energy aspect, this is due to the lower potential volume flow to be heated (as a result of the lack of nitrogen load) and other reasons, such as the technical challenges for the materials used when heating oxygen in heat exchangers.

Regardless of the type of oxidant used, heat recovery from the flue gas is comparatively inefficient in known processes for operating glass melting furnaces. In an oxygen-operated glass melting furnace, heat recovery is typically even worse than in an air-operated glass melting furnace due to the poorly preheatable oxygen. This leads to heat loss in the form of exhaust gas to the environment. The low energy efficiency ultimately leads to an increased consumption of fuel and oxidizing agents as well as to a higher environmental impact due to increased emissions.

Waste heat recovery from the flue gas of glass melting furnaces can also take the form of cooling the hot flue gas and a simultaneous evaporation of water, i.e. steam generation. Steam produced in this way can then be used for various purposes, such as heating. Often, however, the operator of the glass melting furnace has no on-site use for the steam generated, so that this steam is converted into electricity in a generator driven by a steam turbine. This electricity can then be used for own consumption or fed into an electricity grid against payment.

In the case of waste heat utilisation for steam generation with downstream electricity generation, the problem is that there is not always a suitable customer for this electricity. Especially in times of low feed-in tariffs, this option may not be economically attractive either. This is why there is now a trend in the glass-melting industry to increasingly use electrical energy to melt or further process glass. The reason for this is that the operators of the glass melting furnaces can purchase electricity very cheaply if they purchase electricity from the grid at certain times of an electricity surplus.

Theoretically, the melting enthalpy in a glass melting furnace could be to 100% provided by direct electric heating, and thus, using regenerative energy, the carbon dioxide footprint could be almost completely eliminated. In practice, however, only about 80% of direct electrical heating is considered possible, since the convective contribution of the flue gas is considered essential for the homogenous temperature distribution which is required for the melt.

For further details regarding glass melting furnaces, reference is made to relevant technical literature, for example Wolfgang Trier, Glasschmelzöfen: Konstruktion und Betriebsverhalten, Springer-Verlag Berlin, Heidelberg, New York, Tokyo 1984.

The present invention has the object of providing improved possibilities for the use of waste heat from a flue gas of a fired furnace, in particular a glass melting furnace.

DISCLOSURE OF THE INVENTION

Against this background, the present invention proposes a method for operating a fired furnace, in particular a glass melting furnace, and a corresponding arrangement with a fired furnace and an electrolysis device with the characteristics of the respective independent claims. Advantageous embodiments of the invention are the subject of the respective dependent claims as well as of the following description.

As mentioned above, reference is mainly made here to glass melting furnaces or glass furnaces, although this invention is also suitable for use in conjunction with other fired furnaces. The reference to glass melting furnaces or glass furnaces should therefore not be understood as restrictive.

If in the following reference is made to "oxygen", "hydrogen" and other gases, this should also be understood to include gas mixtures which contain a predominant proportion, in particular more than 50%, 60%, 70%, 80%, 90%, 95%, 99% or 99.5%, of the gas specified in each case. In particular, the terms mentioned also refer to so-called "technical" gases with corresponding specifications.

The present invention is based on the finding that an improved waste heat utilisation can be achieved from the flue gas of a glass melting furnace by using this waste heat in a high-temperature electrolysis of e.g. water.

In addition to the chemical conversion of fossil feedstocks into synthesis gas, for example by steam reforming, hydrogen can also be produced by the electrochemical conversion of water, wherein the following gross reaction is observed:

$$H_2O \rightarrow H_2 + 0.5O_2$$

Depending on the electrolyte and the separator used, essentially three types of water electrolysis with different half-cell reactions can currently be distinguished. If the water electrolysis is operated with regenerative energy, the production of hydrogen in this way is essentially emission-free.

In low-temperature electrolysis with a proton conducting membrane (Proton Exchange Membrane Electrolysis, PEMEL) the cathode reaction is a conversion of two protons with two electrons to molecular hydrogen. At the anode, two protons, (mathematically) half an oxygen molecule and two electrons are formed from one water molecule. The charge carriers are protons that are transported through the membrane used:

Cathode: $2H^+ + 2e^- \rightarrow H_2$

Anode: $H_2O \rightarrow 2H^+ + 0.5O_2 + 2e^-$

Charge carrier: $H^+$

In low-temperature electrolysis with anion exchange separator (Anion Exchange Electrolysis, AEL), two water molecules react at the cathode with two electrons to form a hydrogen molecule and two hydroxide ions. The anode reaction comprises the reaction of two hydroxide ions to (mathematically) half an oxygen molecule and a water molecule as well as two electrons. The hydroxide ions represent the charge carriers:

Cathode: $2H_2O + 2e^- \rightarrow H_2 + 2OH^-$

Anode: $2OH^- \rightarrow 0.5O_2 + H_2O + 2e^-$

Charge carrier: $OH^-$

High-temperature electrolysis with a solid oxide electrolyzer cell (Solid Oxide Electrolyzer Cell, SOEC), which conducts oxygen ions, involves the cathode reaction of a water molecule with two electrons to form a hydrogen molecule and an oxygen ion. At the anode an oxygen ion reacts to (mathematically) half an oxygen molecule and two electrons. The oxygen ions are the charge carriers:

Cathode: $H_2O + 2e^- \rightarrow H_2 + O_2^-$

Anode: $O_2^- \rightarrow 0.5O_2 + 2e^-$

Charge carrier: $O_2^-$

While the PEMEL and AEL are limited to temperatures below the evaporation temperature of water due to the presence of an aqueous environment, the oxygen conductivity of SOEC is only given above 600° C. Advantageous operating temperatures range between 700 and 900° C.

Conventional high-temperature processes have so far typically been based exclusively on the use of fossil fuels, mostly natural gas, in the case of a glass melting furnace to provide the melting enthalpy. In addition, the glass produced also has a carbon dioxide footprint, which can lead to a reduction in profitability in view of higher carbon dioxide certificate prices. The carbon dioxide footprint can be reduced, but not avoided, by improving waste heat utilisation and thus reducing fuel consumption.

In the case of waste heat utilisation for steam generation with downstream power generation, the problem, as mentioned above, is that there is not always a suitable customer for this electricity. Especially in times of low feed-in tariffs, this option is not always attractive.

A major advantage of this invention is that the waste heat, especially from glass melting furnaces, can be used in an advantageous way to convert water into fuel in the form of hydrogen and oxygen. This is achieved by using the energy recovered from the flue gas to evaporate water for high-temperature electrolysis and then further heat it to the operating temperature of the SOEC.

DETAILED DESCRIPTION OF THE INVENTION

Overall, this invention proposes a method of operating a fired furnace, in particular a glass melting furnace, which is heated using a fuel gas stream and forming a combustion product stream. The furnace is heated at least in part using a corresponding fuel gas, but in the context of the present invention a corresponding furnace can be heated in particular also in part electrically. As already explained above, 100% of the melting enthalpy can theoretically be provided by direct electrical heating, but at present, however, practical use of electrical heating is usually only possible to an extent of about 80%, since a convective contribution of the flue gas is essential for the homogenous temperature distribution required in the glass melt.

As is known in this respect from the prior art, heat from at least part of the combustion product stream is also used in the present invention in the context of heat recovery in the formation of a steam stream. The "formation" of the steam stream comprises the usual steps known from steam generation, namely the preheating of water (boiler feed water) from a feed temperature, e.g. approx. 15° C., to a temperature just below the evaporation temperature at the pressure used. Typical pressures used for preheating boiler feed water are in the range of approx. 1.5 to 2.0 bar and the preheated water may be approx. 1.8 bar. The preheating takes place at a temperature level of approx. 115° C., for example. All pressure specifications here refer to absolute pressures.

Preheated water can then be evaporated in the course of steam generation, initially forming saturated steam. The saturated steam formed is typically present at a temperature level of, for example, approx. 115° C. and a pressure level of, for example, approx. 1.6 bar. By further heating, hot steam or superheated steam can be formed from the corresponding saturated steam, for example at a temperature level of approx. 750° C. A pressure level at which corresponding superheated steam is provided, for example, is approx. 1.4 bar. In addition to the use of waste heat, heating may at any time include other means of heating, such as electric heaters. However, electrical heating or alternative firing can also be used if, for example, sufficient heat or no heat is available from a combustion product stream, for example in the course of a start-up procedure in a corresponding process.

In accordance with the invention, it is provided that at least a part of the steam stream is subjected to high-temperature electrolysis in a corresponding electrolysis device to form a hydrogen-containing and an oxygen-containing substance stream, and that at least a part of the hydrogen-containing substance stream is used as the fuel gas stream which is used to heat the furnace.

The following invention therefore, in contrast to the prior art, where corresponding steam is typically used for the generation of electrical energy or for heating purposes, provides for the electrolysis of the steam, using in particular a SOEC described above. The waste heat from the glass melting furnace can thus be used directly to produce hydrogen within the scope of the present invention, which in turn can be used as fuel for firing the furnace.

The thermal energy contained in a corresponding combustion product stream can be recovered to a greater extent than in the prior art by the measures proposed according to the invention. In particular, the combustion product stream, which essentially consists of steam in the case of the exclusive combustion of hydrogen, can be cooled to a temperature level of, for example, approx. 105° C. at a slightly above atmospheric pressure level of, for example, approx. 1.05 bar. This temperature level is well below the temperature level conventionally reached during the cooling of flue gas from glass melting furnaces.

In high-temperature electrolysis, in which an oxygen-containing substance stream is formed in addition to the hydrogen-containing substance stream within the scope of the present invention, at least part of this oxygen-containing substance stream can be used together with the fuel gas stream, i.e. the oxidizing agent, to heat a corresponding gas melting furnace. If the oxygen available here is not sufficient, for example because an over-stoichiometric oxygen supply is required for safe complete combustion of the hydrogen, it is also possible to work with an excess of oxygen. This means that externally supplied oxygen can be added to the process. This can come from known sources, such as air separation or a separate electrolysis.

The "hydrogen-containing substance stream" formed in the course of high-temperature electrolysis within the scope of the present invention typically comprises hydrogen and only water in the form of non-electrolyzed steam. The same applies to the "oxygen-containing substance stream" formed in the course of high-temperature electrolysis. In an electrolysis process using a SOEC, steam is supplied both on the cathode side and on the anode side. In this way, a corresponding combustion product stream can also be provided carbon dioxide-free if no other fuel gases are used. In particular, the present invention does not burn fossil fuels to heat the glass melting furnace.

In the context of the present invention and in all the configurations described here, the steam can thus be supplied to the high-temperature electrolysis on the cathode side and on the anode side, wherein a ratio of the quantities of steam supplied on the anode side and on the cathode side to one another in the context of the invention can be in particular between 0.1 and 1, further in particular between 0.3 and 0.9, preferably between 0.5 and 0.8. Instead of or in addition to a supply of steam to the anode side, air can also be supplied to the anode side. The anode side can therefore also be flushed completely or partially with air in all forms of the present invention.

The hydrogen-containing substance stream formed within the context of the present invention in the course of high-temperature electrolysis, which is provided on the cathode side, can be fed back to high-temperature electrolysis on the cathode side at least in part, in particular in an adjustable part, in all the embodiments described here. By such an adjustment, a hydrogen content can be specifically set to a desired value. It is advantageous to adjust the hydrogen content from 0.1 to 10 mol %, and in particular from 1 to 8 mol %, preferably from 3 to 5 mol %. This will also be explained below in relation to a specific embodiment.

Within the context of the present invention and in all its embodiments, the high-temperature electrolysis is advantageously operated by setting the process conditions used in such a way that the water conversion on the cathode side of high-temperature electrolysis is 60 to 100%, in particular 70 to 95%, preferably 80 to 90%. The percentages are dimensionless and refer to the initial water content.

As explained above, the formation of a corresponding steam stream includes preheating of water used to form the steam stream, evaporation of the preheated water to saturated steam, and superheating or further heating of the saturated steam to obtain superheated steam. In return, the cooling of the combustion product stream comprises several cooling steps in which the combustion product stream is successively cooled down to its condensation temperature. These steps are explained in more detail below from the direction of cooling the combustion product stream from high to low temperature and with reference to different embodiments of the present invention. They are referred to as "heat exchange steps".

The heat exchange steps carried out in the context of the present invention include, in a first configuration of the invention, a first heat exchange step in which the combustion product stream or a part thereof is cooled from a temperature level of 1400 to 1600° C. to a temperature level of 900 to 1100° C. This cooling takes place, for example, from a temperature level at approx. 1500° C. to a temperature level at approx. 980° C. and at a pressure level slightly above atmospheric pressure, with a slight pressure reduction resulting during cooling. The corresponding pressure levels, for example, are approx. 1.05 bar before the first heat exchange step and approx. 1.0 bar after the first heat exchange step.

In the course of this first heat exchange step, the saturated steam used to form the steam stream which is fed to the high-temperature electrolysis can be superheated from a temperature level of, for example, approx. 100 to 120° C. to a temperature level of, for example, approx. 700 to 900° C. in this first embodiment of the present invention. For example, an overheating occurs from a temperature level of approx. 115° C. to a temperature level of approx. 750° C. Corresponding superheated steam in this first embodiment, but also in all other embodiments of the invention, can optionally be further heated and fed to the high-temperature electrolysis in the form of corresponding partial streams on the cathode side and on the anode side (as purge gas stream). A pressure of the saturated steam before superheating can, for example, be approx. 1.4 to 1.8 bar, in particular approx. 1.6 bar. The pressure of the saturated steam after a corresponding superheat, for example, is approx. 1.2 bar to 1.6 bar, in particular approx. 1.4 bar. The pressure loss results from the lower pressure in the high-temperature electrolysis and the heat exchanger structures.

In a subsequent second heat exchange step, the combustion product stream or part thereof is further cooled from a temperature level of, for example, approx. 900 to 1100° C., in particular approx. 980° C., to a temperature level of, for example, approx. 100 to 200° C., in particular approx. 150° C., in the first form of the present invention. This cooling can take place, for example, from an atmospheric or slightly superatmospheric pressure level of approx. 1.0 to 1.1 bar, for example approx. 1.0 bar, to a slightly subatmospheric pressure level of approx. 0.9 to 1.0 bar, for example approx. 0.95 bar. This slightly subatmospheric pressure level results in particular from the use of a downstream compressor or blower, which conveys the combustion product stream.

In this second heat exchange step, in the first configuration of the present invention, in return for cooling the combustion product stream, preheated water is evaporated to saturated steam, for example starting from a temperature level of approx. 110 to 120° C., in particular approx. 115° C., and a pressure level of approx. 1.6 bar to 2.0 bar, in particular approx. 1.8 bar. The saturated steam is present at a slightly lower pressure level of, for example, approx. 1.4 to 1.8 bar, in particular approx. 1.6 bar, than the preheated water, and at a comparable temperature level to this. As explained below, only a part of the preheated water can be evaporated in the second heat exchange step, especially if, depending on the process conditions, the flue gas enthalpy is not sufficient for complete evaporation of the feed water. In this case, part of the preheated water can be evaporated separately, e.g. electrically, and then added back to the saturated steam formed in the second heat exchange step.

The preheating of the water used to generate the saturated steam takes place in the first embodiment of the present invention, but also in all other forms, in a third heat exchange step before, which is explained below, and in which the combustion product stream is further cooled and in particular (partially) condensed.

In a second embodiment of the present invention that is alternative to the first embodiment, the combustion product stream is first used for evaporation and only then for superheating the steam. Again, however, the corresponding heat exchange steps are given below from the direction of the combustion product stream from higher to lower temperature.

The heat exchange steps used in the second embodiment of the invention include a first heat exchange step in which the combustion product stream is cooled from its initial temperature level, as previously explained, and at the pressure previously explained for the first heat exchange step to a temperature level of, for example, about 600 to 700° C., in particular about 620° C. The first heat exchange step is a heat exchange step in which the combustion product stream is cooled from its initial temperature level, as previously explained, and at the pressure previously explained for the first heat exchange step to a temperature level of, for example, about 600 to 700° C., in particular about 620° C. The second heat exchange step is a heat exchange step in which the combustion product stream is cooled from its initial temperature level, as explained. As before, the pressure level will decrease slightly. In the second embodiment of the present invention, however, this first heat exchange step does not take place in relation to the overheating of steam, but rather to the evaporation of the preheated water, which is evaporated in this first heat exchange step of the embodiment of the invention described above to form saturated steam. The water and steam parameters may correspond to those of the first embodiment of the invention described above.

In this second embodiment of the present invention, the heat exchange steps also include a second heat exchange step in which the combustion product stream or part of it is cooled from a temperature level of, for example, approx. 600 to 700° C. to a temperature level of, for example, approx. 100 to 200° C. The heat exchange steps are then used to cool the combustion product stream or part of it. Cooling can, for example, take place from the mentioned temperature level of approx. 620° C. to a temperature level of approx. 150° C., wherein here too the pressure level can be lowered from atmospheric pressure to slightly below atmospheric pressure.

In contrast to this second heat exchange step, in the second embodiment of the invention the saturated steam generated in the first heat exchange step is superheated from a temperature level of, for example, approx. 100 to 120° C. to a temperature level of, for example, approx. 600 to 700° C., in particular approx. 590° C., while obtaining superheated steam. The embodiment of the present invention described above thus differs from the embodiment of the present invention described above from the sequence of the first and second heat exchange steps.

The second embodiment of the present invention can be advantageous, since the heat of the combustion product stream can still be sufficient for the evaporation of the preheated water due to the different sequence of the heat exchange steps. Therefore, an (electric) evaporator can be saved in this configuration, which can have a positive effect on the plant costs. However, the power input previously applied by the electric evaporator, which was no longer required, is not no longer required in this embodiment, but must now be provided by one or more corresponding heaters used for the superheated steam due to the lower temperature of the superheated steam. While such heaters are optional in the first embodiment of the invention or are only required during start-up, they are typically also required in control operation in the second embodiment.

In a third embodiment of the present invention, which differs once again, the heat integration in the second heat exchange step no longer takes place to generate superheated steam, but (at least predominantly) to heat the hydrogen-containing and/or the oxygen-containing substance stream which is formed in the high-temperature electrolysis.

In this third configuration, the second heat exchange step comprises cooling the combustion product stream or part thereof from a temperature level of, for example, approx. 600 to 700° C., in particular approx. 620° C., to a temperature level of (only), for example, approx. 300 to 400° C., in particular approx. 380° C., and heating, in the second heat exchange step, the hydrogen-containing and/or oxygen-containing substance stream formed in the high-temperature electrolysis. The cooling of the combustion product stream or its part can, for example, take place under slight pressure reduction from atmospheric pressure to approx. 0.95 bar. In a further sub-step of the second cooling step, a correspondingly cooled combustion product stream can be cooled again in countercurrent under overheating of steam, wherein in this further sub-step, however, typically only a slight further cooling of the combustion product stream by, for example, approx. 30° C. or by approx. 20 to 50° C. results.

The advantage of this embodiment is that, because of the possibility of an additional pressure increase of the electrolysis product streams with the help of compressors or blowers, an optimal inlet pressure for the burner can be ensured. This pressure increase is possible because the product streams, i.e. the hydrogen-containing and oxygen-containing substance streams, can be fed to the pressure increase in the third embodiment of the invention at a lower temperature level. As in the other embodiments of the invention, they are taken from high-temperature electrolysis at a temperature level of 700 to 900° C., in particular approx. 800° C., and a pressure level of, for example, approx. 1.0 to 1.2 bar, in particular approx. 1.1 bar, and in the third embodiment they can each be cooled against saturated steam streams or only slightly superheated steam streams which are then fed to high-temperature electrolysis on the anode and cathode sides as superheated steam streams. This cooling enables for an unproblematic compression.

The saturated or alternatively only slightly superheated steam streams, for example at a temperature level of approx. 140 to 160° C., are present because in the third embodiment no steam superheating (or at least no steam superheating to the extent described above) is carried out by means of the combustion product stream. The steam streams superheated in the heat exchange with the hydrogen-containing and oxygen-containing substance streams can be maintained at a temperature level of, for example, approx. 600 to 800° C., in particular approx. 750° C., and a pressure level of, for example, approx. 1.1 to 1.5 bar, in particular approx. 1.2 bar.

A compressor or a corresponding blower used in the third embodiment for the hydrogen-rich substance stream obtained on the cathode side can at the same time compress a recirculation stream formed from the hydrogen-rich substance stream, which is advantageously fed back to the cathode side to provide reducing conditions in order to avoid nickel oxidation. It is advantageous to carry out a corresponding recirculation in the other embodiments of the invention as well, but in a different way, for example by simply cooling down a substance stream to be recycled. As mentioned above, compression may not be possible at the high temperatures at the outlet of the high-temperature electrolysis unit.

In all the configurations of the present invention described above, the second heat exchange step may be followed by a third heat exchange step in which the combustion product stream or part thereof is cooled from a temperature level of 100 to 200° C. to a lower temperature level and partially condensed. In this third cooling step, for example, cooling can take place to a temperature level of approx. 105° C. at a pressure level of approx. 1.05 bar, for example. Corresponding condensate can be discharged into the atmosphere and/or separated to provide further boiler feed water.

In all embodiments of the present invention, the flue gas, or at least its part subjected to the second and third cooling steps, can be compressed between the second and third cooling steps, for example to a pressure level of 1.25 bar. In the course of this compression, a further temperature increase takes place due to the increase in the internal energy, for example to a temperature level of approx. 180° C. However, a corresponding compression can also take place downstream of the third heat exchange step, in particular in the third embodiment of the present invention described above. Upstream compression has the advantage that the compression heat can also be used for steam generation.

In the context of this invention, some of the energy required to generate steam, in particular for evaporation in the first embodiment of this invention, can be provided from a heat source separate from the combustion product stream, as explained above. Details have already been mentioned.

In the context of this invention, the hydrogen-containing and oxygen-containing substance streams formed in high-temperature electrolysis can be cooled in particular against steam, which is fed to the high-temperature electrolysis. This has already been explained before with reference to the third embodiment of the invention. In particular, this can involve two partial streams of a corresponding steam stream described above, which are fed to the high-temperature electrolysis on the cathode or anode side. The hydrogen-containing and oxygen-containing substance stream can be compressed following a corresponding heat exchange and then fed to the furnace.

As already explained several times, the furnace can also be partially electrically heated within the context of the present invention, wherein the part of the energy provided by the oxidation of hydrogen from high-temperature electrolysis within the context of the present invention, for example, can amount to approx. 15 to 25%, in particular approx. 20%, of the energy required for the melting process. The remaining part can be provided by direct heating. Depending on the process conditions, between 1.5 and 2.1 megawatts of electrical energy are required for high-temperature electrolysis, electric heaters and blowers to provide one megawatt of thermal power which is absorbed by the glass melt.

In all of the embodiments of the present invention explained above and below, the high-temperature electrolysis can be operated at a pressure that makes it unnecessary to compress the product streams for further use. The pressure used in the high-temperature electrolysis will therefore be adapted to the corresponding application and is at least at an inlet pressure required there.

The present invention also covers an arrangement with a fired furnace, in particular a glass melting furnace, which may in particular be arranged to carry out a process as previously explained in various embodiments. With regard to further features and advantages of the arrangement proposed in accordance with the invention, reference is made explicitly to the above explanations concerning the procedure proposed in accordance with the invention and its preferred embodiments.

All in all, this invention, in its respective embodiments, enables the sustainable operation of a fired furnace, in particular a glass melting furnace, without the use of fossil fuels. When regeneratively generated electrical energy is used, the process has no carbon dioxide footprint. The heat of the combustion product stream can be optimally utilized without the co-production of export steam. The present invention also reduces the formation of thermal nitrogen oxides by providing a nitrogen-free fuel and oxidizing agent. A high steam content in the fuel gas also counteracts the formation of thermal nitrogen oxides from external air draught. The present invention allows a simplified fuel gas preheating in some of the embodiments described above, since instead of oxygen and hydrogen only steam has to be superheated, which is technically advantageous.

The invention is explained below with reference to the attached drawings, which illustrate arrangements according to embodiments of the present invention.

DETAILED DESCRIPTION OF THE DRAWINGS

Figure 1:
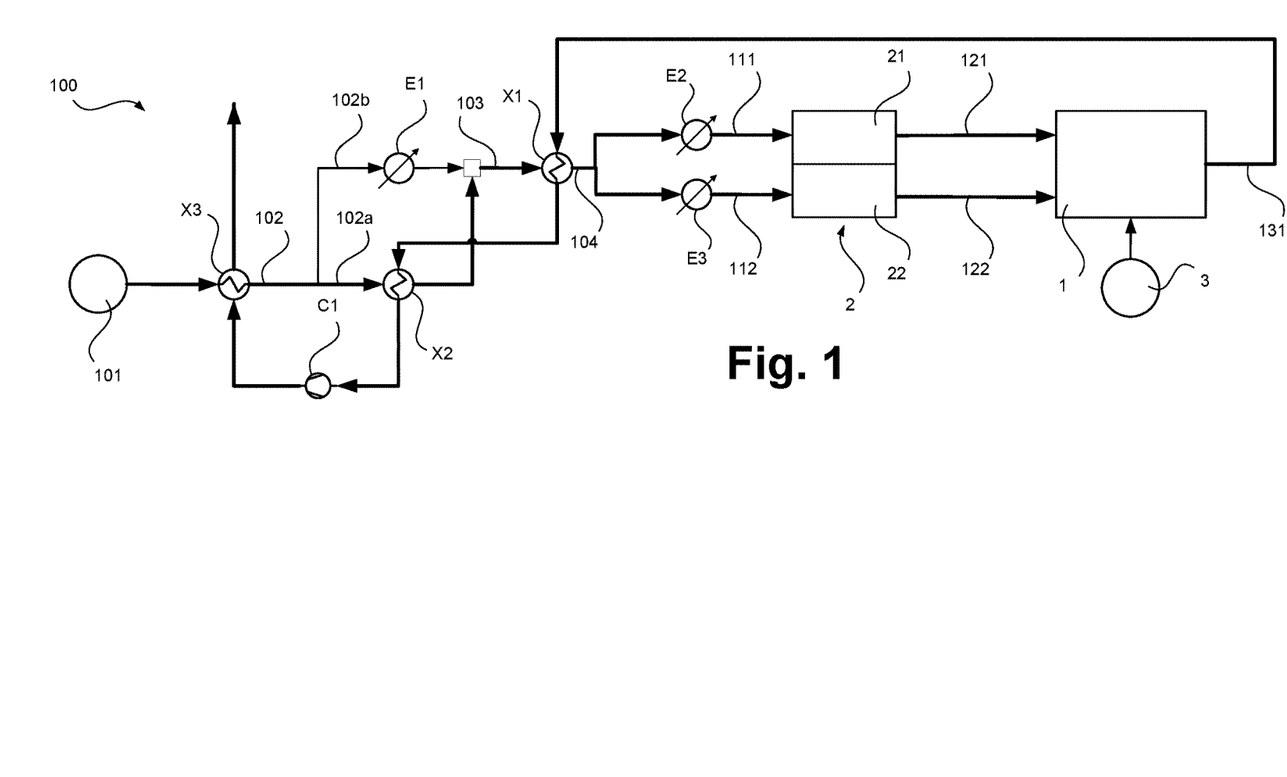
FIG. 1 illustrates an arrangement according to an embodiment of the invention.
Figure 2:
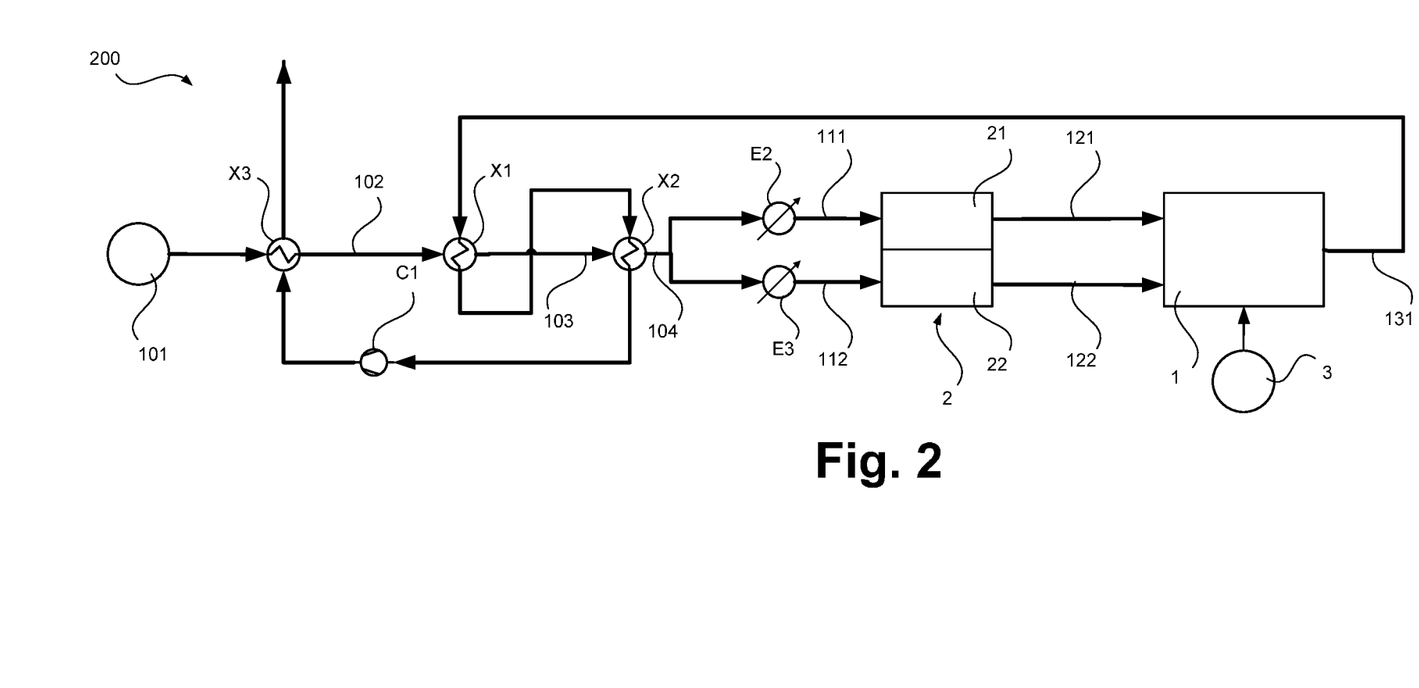
FIG. 2 illustrates an arrangement according to an embodiment of the invention.
Figure 3:
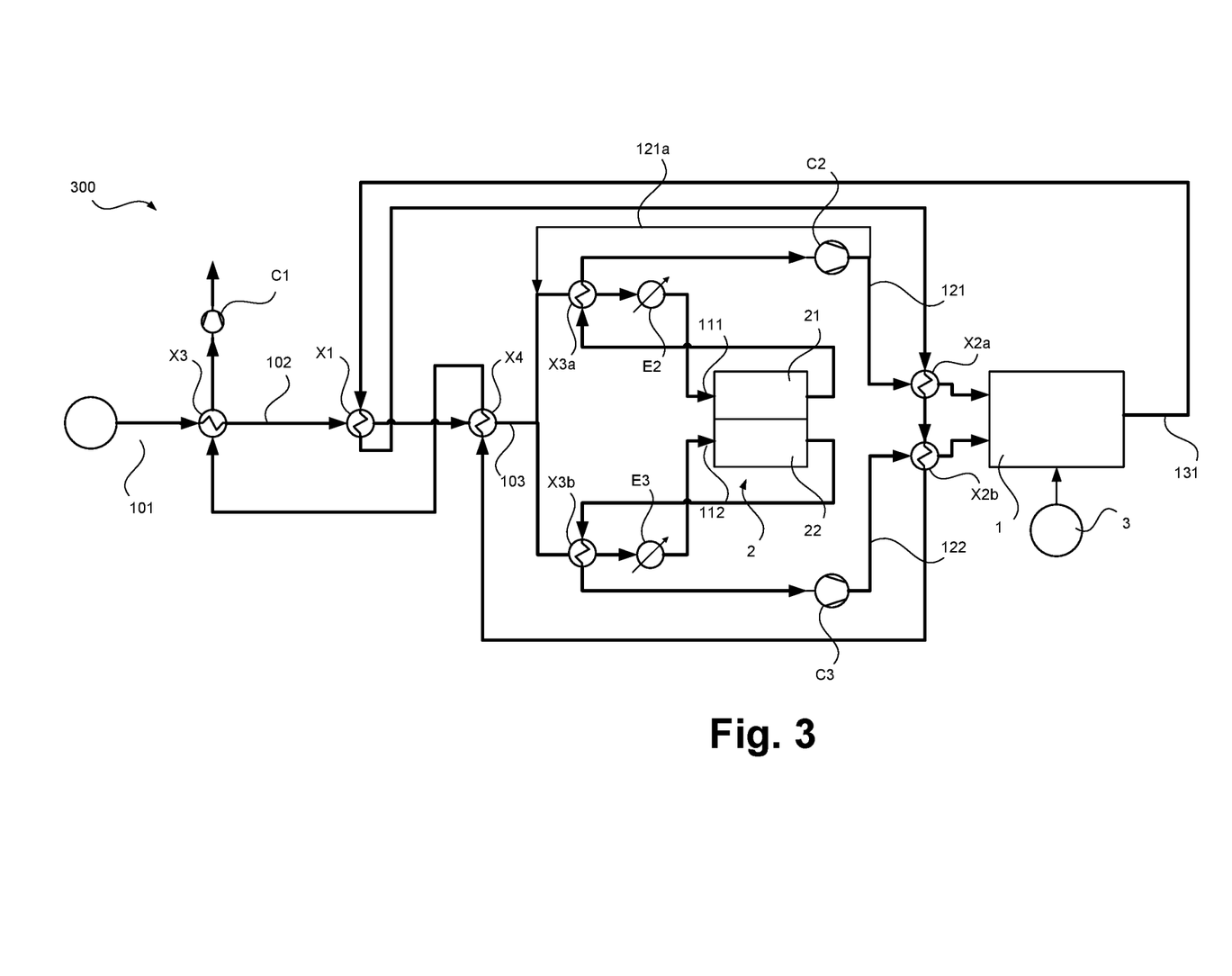
FIG. 3 illustrates an arrangement according to an embodiment of the invention.

FIG. 1 illustrates an arrangement in accordance with an embodiment of the present invention designated 100. Further embodiments are illustrated in FIGS. 2 and 3, where they are designated 200 and 300 respectively. The arrangement 100 in FIG. 1 corresponds at least in part to the first embodiment of the invention described above, the arrangement 200 in FIG. 2 corresponds at least in part to the second embodiment described above and the arrangement 300 in FIG. 3 corresponds at least in part to the third embodiment of the invention described above.

All arrangements 100 to 300 have in common a glass melting furnace 1 and an electrolysis device 2 with a cathode side 21 and an anode side 22, all arrangements 100 to 300 also provide water (boiler feed water) (W) and ultimately use it to form two steam streams 111 and 112 which are supplied to the cathode side 21 and the anode side 22, respectively, of the electrolysis device 2. The formation of these steam streams 111 and 112 is explained separately for the individual embodiments below.

Using the electrolysis device, a hydrogen-containing 121 and an oxygen-containing 122 gas stream are also formed in all embodiments. In addition to hydrogen and oxygen, both gas streams 121 and 122 also contain water in the form of superheated steam. They are fed to the glass melting furnace 1 and burned there. An external oxygen feed 3 can be provided to cover any additional oxygen demand that may be required. In all the forms of the present invention, a combustion product stream 131 is extracted from the glass melting furnace 1. The embodiments of the present invention, which are illustrated using arrangements 100 to 300, differ in particular in the sequence or specific embodiment of heat recovery from the combustion product stream 131, which is explained in detail below.

In the arrangement 100 as shown in FIG. 1, the combustion product stream 131 is first fed to a heat exchanger X1 in which saturated steam 103 is superheated and superheated steam 104 is formed. The superheated steam is divided into steam streams 111 and 112. After cooling down in the heat exchanger X1, the combustion product stream F is fed to a heat exchanger X2, in which preheated water is evaporated to saturated steam. The preheated water is supplied in the form of a water stream 102 and passed through the heat exchanger X2 in the form of a partial stream 102*a*. Another partial current 102*b* is evaporated in an electric heater E1. The evaporated partial streams 102*a* and 102*b* are combined after the evaporation to a saturated steam stream 103.

After cooling in the heat exchanger X2, the combustion product stream 131 is subjected to compression in a compressor or blower C1 and then passed through another heat exchanger X3, which serves to preheat the water stream 101. The water contained in the combustion product stream 131 condenses at least partially in the heat exchanger X3.

Further elements shown in FIG. 1 are further electric heaters E2 and E3, which use steam streams 111 and 112 respectively in cases where there is no or too little waste heat from the combustion product stream 131.

In the arrangement 200 illustrated in FIG. 2, the combustion product stream 131 first streams through the heat exchanger X1 and is cooled accordingly. In heat exchanger X1, preheated water (boiler feed water) 102 is evaporated to saturated steam 103. As explained above, in this arrangement the formation of the partial currents 102*a* and 102*b* and the use of electric heater E1 can be dispensed with. After cooling in heat exchanger X1, combustion product stream 131 is passed through heat exchanger X2, where superheated steam 104 is generated. The further arrangement here essentially corresponds to that shown in FIG. 1, although the electric heaters E2 and E3 are permanently operated here due to the lower degree of overheating in the heat exchanger X2.

FIG. 3 illustrates an arrangement according to a further development of the present invention and is marked with a total of 300. This in turn differs in the use of heat exchangers and the type of waste heat recovery.

The combustion product stream 131 is passed through heat exchangers X2*a* and X2*b* downstream of heat exchanger X1, the use of which basically corresponds to that of FIG. 2 and arrangement 200, and is thus used to heat the hydrogen-containing substance stream 121 and the oxygen-containing substance stream 122. These substance streams 121 and 122 are compressed in compressors C2 and C3, which, as mentioned above, is possible due to a previous cooling of the gas streams 121 and 122. This cooling in turn takes place in heat exchangers X3*a* and X3*b* in counterflow to steam streams 111 and 112, which are initially provided here in an unheated or only slightly overheated state and, after overheating in heat exchangers X3*a* and X3*b*, are fed to electrolysis unit 2. A further cooling of the combustion product stream 131 takes place in the heat exchanger X4 by overheating the steam stream 103. As also illustrated here, a (particularly adjustable) partial stream 121*a* of the substance stream 121 is returned to the high-temperature electrolysis 1, as explained above.

The invention claimed is:

1. A method for operating a fired furnace, comprising:
    heating a fired furnace using a fuel gas stream and forming a combustion product stream,
    forming a steam stream using heat from at least a part of the combustion product stream,
    subjecting at least a part of the steam stream to a high temperature electrolysis to form a hydrogen-containing substance stream and an oxygen-containing substance stream, and
    using at least a part of the hydrogen-containing substance stream as the fuel gas stream,
    wherein formation of the steam stream comprises a plurality of heat exchange steps to which the combustion product stream or a part thereof is subjected, wherein water used to form the steam stream and/or steam used to form the steam stream is heated in the heat exchange steps, and
    wherein the plurality of heat exchange steps comprises a first heat exchange step in which
    (a) the combustion product stream or a portion thereof is cooled from a temperature level of 1400 to 1600° C. to a temperature level of 900 to 1100° C., and in which saturated steam used to form the steam stream is superheated from a temperature level of 100 to 120° C. to a temperature level of 700 to 900° C., or
    (b) the combustion product stream or a portion thereof is cooled from a temperature level of 1400 to 1600° C. to a temperature level of 600 to 700° C., and in which water used to form the steam stream is evaporated to form saturated steam.

2. The method according to claim 1, further comprising using at least a part of the oxygen-containing substance stream together with the fuel gas stream to heat the furnace.

3. The method according to claim 1, wherein in the first heat exchange step combustion product stream or a portion thereof is cooled from a temperature level of 1400 to 1600° C. to a temperature level of 900 to 1100° C., and saturated steam used to form the steam stream is superheated from a temperature level of 100 to 120° C. to a temperature level of 700 to 900° C., and wherein the plurality of heat exchange steps comprises a second heat exchange step in which the combustion product stream or a portion thereof is cooled from a temperature level of 900 to 1100° C. to a temperature level of 100 to 200° C., and in which water used to form the steam stream is evaporated to form saturated steam.

4. The method according to claim 3, wherein the plurality of heat exchange steps comprises a third heat exchange step in which the combustion product stream or a part thereof is cooled from a temperature level of 100 to 200° C. to a lower temperature level and is thereby partially condensed, and in which water used to form the steam stream is preheated.

5. The method according to claim 4, wherein the combustion product stream or part thereof that is subjected to the second and third heat exchange steps is compressed between the second and third heat exchange steps or after the third heat exchange step.

6. The method according to claim 1, wherein in the first heat exchange step the combustion product stream or a portion thereof is cooled from a temperature level of 1400 to 1600° C. to a temperature level of 600 to 700° C., and in which water used to form the steam stream is evaporated to form saturated steam.

7. The method according to claim 6, wherein the plurality of heat exchange steps comprises a second heat exchange step in which the combustion product stream or a portion thereof is cooled from a temperature level of 600 to 700° C. to a temperature level of 100 to 200° C., and in which saturated steam used to form the steam stream is superheated from a temperature level of 100 to 120° C. to a temperature level of 700 to 900° C.

8. The method according to claim 7, wherein the plurality of heat exchange steps comprises a third heat exchange step in which the combustion product stream or a part thereof is cooled from a temperature level of 100 to 200° C. to a lower temperature level and is thereby partially condensed, and in which water used to form the steam stream is preheated.

9. The method according to claim 8, wherein the combustion product stream or part thereof that is subjected to the second and third heat exchange steps is compressed between the second and third heat exchange steps or after the third heat exchange step.

10. The method according to claim 6, wherein the plurality of heat exchange steps comprises a second heat exchange step in which the combustion product stream or part thereof is cooled from a temperature level of 600 to 700° C. to a temperature level of 300 to 400° C., and in which the hydrogen-containing substance stream and/or oxygen-containing substance stream formed in the high temperature electrolysis is heated.

11. The method according to claim 10, wherein the plurality of heat exchange steps comprises a third heat exchange step in which the combustion product stream or a part thereof is cooled from a temperature level of 100 to 200° C. to a lower temperature level and is thereby partially condensed, and in which water used to form the steam stream is preheated.

12. The method according to claim 11, wherein the plurality of heat exchange steps comprises a further heat exchange step, between the second heat exchange step and the third heat exchange step, in which combustion product stream or a portion thereof is cooled, and in which saturated steam used to form the steam stream is superheated.

13. The method according to claim 11, wherein the combustion product stream or part thereof that is subjected to the second and third heat exchange steps is compressed between the second and third heat exchange steps or after the third cooling step.

14. The process according to claim 1, wherein a heater operated by a separate heat source is also used to evaporate the water.

15. The method according to claim 1, wherein the hydrogen-containing and oxygen-containing substance streams formed in the high temperature electrolysis are cooled against steam supplied to the high temperature electrolysis.

16. The method according to claim 1, wherein the furnace is partially electrically heated.

17. The method according to claim 1, wherein in the first heat exchange step combustion product stream or a portion thereof is cooled from a temperature level of 1400 to 1600° C. to a temperature level of 900 to 1100° C., and in which saturated steam used to form the steam stream is superheated from a temperature level of 100 to 120° C. to a temperature level of 700 to 900° C.

18. A method for operating a fired furnace, comprising:
heating a fired furnace using a fuel gas stream and forming a combustion product stream,
forming a steam stream by preheating water, evaporating the preheated water to form saturated steam, and heating the saturated steam to form superheated steam, wherein heat from at least a part of the combustion product stream is used in forming the steam stream,
subjecting at least a part of the steam stream to a high temperature electrolysis to form a hydrogen-containing substance stream and an oxygen-containing substance stream, and
using at least a part of the hydrogen-containing substance stream as the fuel gas stream,
wherein formation of the steam stream comprises a plurality of heat exchange steps to which the combustion product stream or a part thereof is subjected, wherein water used to form the steam stream and/or steam used to form the steam stream is heated in the heat exchange steps, and
wherein the plurality of heat exchange steps comprises a first heat exchange step in which
(a) the combustion product stream or a portion thereof is cooled from a temperature level of 1400 to 1600° C. to a temperature level of 900 to 1100° C., and in which saturated steam used to form the steam stream is superheated from a temperature level of 100 to 120° C. to a temperature level of 700 to 900° C., and/or
(b) the combustion product stream or a portion thereof is cooled from a temperature level of 1400 to 1600° C. to a temperature level of 600 to 700° C., and in which water used to form the steam stream is evaporated to form saturated steam.

* * * * *